US011675519B2

(12) United States Patent
Pai et al.

(10) Patent No.: US 11,675,519 B2
(45) Date of Patent: Jun. 13, 2023

(54) TECHNIQUES FOR FACILITATING PROCESSING CHECKPOINTS BETWEEN COMPUTING DEVICES

(71) Applicant: Apple Inc., Cupertino, CA (US)

(72) Inventors: Krishna G. Pai, San Jose, CA (US); Alexander D. Holmes, San Jose, CA (US); M. Mansur Ashraf, Pleasanton, CA (US); Alaukik Aggarwal, San Jose, CA (US)

(73) Assignee: Apple Inc., Cupertino, CA (US)

( * ) Notice: Subject to any disclaimer, the term of this patent is extended or adjusted under 35 U.S.C. 154(b) by 198 days.

(21) Appl. No.: 17/109,077

(22) Filed: Dec. 1, 2020

(65) Prior Publication Data

US 2021/0165574 A1 Jun. 3, 2021

Related U.S. Application Data

(62) Division of application No. 16/058,969, filed on Aug. 8, 2018, now Pat. No. 10,871,912.

(60) Provisional application No. 62/609,238, filed on Dec. 21, 2017.

(51) Int. Cl.
*G06F 3/06* (2006.01)
(52) U.S. Cl.
CPC .............. *G06F 3/065* (2013.01); *G06F 3/067* (2013.01); *G06F 3/0619* (2013.01)
(58) Field of Classification Search
CPC . G06F 3/06; G06F 3/065; G06F 3/067; G06F 3/0619
See application file for complete search history.

(56) References Cited

U.S. PATENT DOCUMENTS

| 7,478,275 | B1 | 1/2009 | Deolasee et al. |
| 8,140,772 | B1 | 3/2012 | Yang |
| 9,372,756 | B2 | 6/2016 | Vandikas et al. |

(Continued)

OTHER PUBLICATIONS

R. Das, S. Sarmah and D. K. Bhattacharyya, "A Distributed Clustering Technique for Intrinsic Cluster Detection," 2006 International Conference on Advanced Computing and Communications, Mangalore, India, 2006, pp. 117-122.*
Akdogan, Afsin, "Partitioning, Indexing and Querying Spatial Data on Cloud", ARXIV, Dec. 18, 2016.*

(Continued)

*Primary Examiner* — Pierre Michel Bataille
(74) *Attorney, Agent, or Firm* — Dickinson Wright RLLP

(57) ABSTRACT

The embodiments set forth techniques for facilitating processing checkpoints between computing devices. A method can be performed by at least one first computing device configured to interface with a first server computing device cluster, and include (1) processing objects managed by the first server computing device cluster, where the objects are stored across at least two first partitions associated with the first server computing device cluster, (2) detecting a condition to facilitate a processing checkpoint with at least one second computing device configured to interface with a second server computing device cluster, where the objects are mirrored—but stored differently across at least two second partitions associated with the second server computing device cluster, (3) gathering, from each partition of the at least two first partitions, information associated with a particular number of last-processed objects, and (4) providing the information to the at least one second computing device.

20 Claims, 9 Drawing Sheets

(56) References Cited

U.S. PATENT DOCUMENTS

| | | | |
|---|---|---|---|
| 2001/0008019 A1 | 7/2001 | Vert et al. | |
| 2008/0033964 A1 | 2/2008 | Richards et al. | |
| 2012/0303999 A1* | 11/2012 | Calder | G06F 11/1471 714/E11.09 |
| 2013/0179729 A1 | 7/2013 | Chiu et al. | |
| 2014/0304231 A1* | 10/2014 | Kamath | G06F 16/27 707/634 |
| 2014/0344326 A1* | 11/2014 | Kamath | G06F 9/5027 709/203 |
| 2015/0234853 A1 | 8/2015 | Ovadya | |
| 2015/0319226 A1* | 11/2015 | Mahmood | H04L 65/611 709/201 |
| 2016/0283123 A1 | 9/2016 | Dobre et al. | |
| 2016/0292050 A1* | 10/2016 | Doshi | G06F 11/1471 |
| 2017/0083562 A1 | 3/2017 | Guney et al. | |

OTHER PUBLICATIONS

Carbone, et al. "Large-Scale Data Stream Processing Systems," Springer International Publishing AG 2017 pp. 219-256 https://www.thesisscientist.com/docs/MiaJordon/99b0511b-64f6-48fe-9a98-8044bd7cdd77.pdf.

Ellis, Byron. Real-time analytics: "Techniques to analyze and visualize streaming data." John Wiley & Sons, Jun. 23, 2014. (397 Pages) http://www-di.inf.puc-rio.br/~endler/courses/RT-Analytics/transp/Books/Real-Time%20Analytics%20Techniques%20to%20Analyze.pdf.

P. Taylor Goetz, Hortonworks "The Future of Apache Storm," Hadoop Summit, published Jul. 11, 2016, San Jose CA (72 Pages) http://www-di.inf.puc-rio.br/~endler/courses/RT-Analytics/transp/Books/Real-Time%20Analytics%20Techniques%20to%20Analyze.pdf.

* cited by examiner

Step 1: Example initial state of objects that are mirrored across two different server device clusters.

Step 2: Consumer devices associated with the first server device cluster process at least a subset of the unprocessed objects.

Step 3: Consumer devices associated with the first server device cluster (1) detect a checkpoint condition, and (2) transmit a sync object including information about (i) a topic, and (ii) a number of last-processed objects associated with the topic.

Step 5: Transmit acknowledgement message, and continue mirroring, processing, and synchronization of new/unprocessed objects across server device clusters.

TECHNIQUES FOR FACILITATING PROCESSING CHECKPOINTS BETWEEN COMPUTING DEVICES

CROSS-REFERENCE TO RELATED APPLICATIONS

The present application is a divisional of U.S. application Ser. No. 16/058,969, filed Aug. 8, 2018, entitled "TECHNIQUES FOR FACILITATING PROCESSING CHECKPOINTS BETWEEN COMPUTING DEVICES," issued Dec. 22, 2020 as U.S. Pat. No. 10,871,912, which claims the benefit of U.S. Provisional Application No. 62/609,238, entitled "TECHNIQUES FOR FACILITATING PROCESSING CHECKPOINTS BETWEEN COMPUTING DEVICES," filed Dec. 21, 2017, the contents of which are incorporated herein by reference in their entirety for all purposes.

FIELD

The described embodiments relate generally to data processing synchronization. More particularly, the described embodiments relate to enabling computing devices to establish and share data processing checkpoints between one another in an efficient manner.

BACKGROUND

Software logging systems enable software applications to transmit, store, and analyze data on a large scale. A popular infrastructure design can include "producer" computing devices that stream data—e.g., individual messages—to a cluster of "broker" computing devices. In turn, the broker computing devices separate the messages into different categories—also commonly referred to as "topics". In some cases, the topics can further be separated into two or more partitions that are managed by different broker computing devices in the cluster. In this manner, the receipt/storage of the messages can be parallelized to increase the overall processing capacity and efficiency of the cluster. Finally, "consumer" computing devices can interface with the broker computing devices to asynchronously obtain and process messages relative to the provision of the messages by the producer computing devices. As a result, the overall level of co-dependency between the producer/consumer computing devices is substantially diminished, thereby providing a flexible architecture that enables large-scale infrastructures to operate in an efficient manner.

In some cases, it can be desirable to increase the overall robustness of the aforementioned infrastructure. In particular, some approaches involve establishing, for a primary cluster (of broker computing devices), at least one auxiliary cluster that mirrors the data managed by the primary cluster. For example, mirroring techniques can be implemented to cause the messages received by the primary cluster to be provided to the auxiliary cluster, such that the auxiliary cluster can be relied upon in the event that the primary cluster fails. For example, when the primary cluster fails, the auxiliary cluster can provide the mirrored data (e.g., to other consumer computing devices) to process the mirrored data, thereby providing a level of high-availability.

Unfortunately, there are considerable drawbacks associated with mirroring approaches that have yet to be addressed. In particular, it is noted that while the messages can be mirrored between the primary cluster and the auxiliary cluster, they typically are stored (i.e., organized) in a distinct manner. This can occur, for example, when the number/configuration of respective broker computing devices belonging to the primary and secondary clusters differ. For example, a given message can be stored in a first partition within the primary cluster, yet be stored in a third partition within the auxiliary cluster as a consequence of the distinct configuration of the auxiliary cluster. In this regard, it can be challenging for the consumer computing devices to efficiently identify a resumption point when a transition occurs from utilizing the primary cluster to utilizing the auxiliary cluster. Consequently, consumer computing devices often end up either skipping or re-processing a considerable number of messages, which is inefficient and undesirable for obvious reasons.

Accordingly, what is needed is an efficient technique for enabling consumer computing devices to resume processing in a robust and efficient manner during cluster failure scenarios.

SUMMARY

Representative embodiments set forth herein disclose various techniques for enabling computing devices to establish and share data processing checkpoints between one another in an efficient manner.

According to some embodiments, a first method for facilitating processing checkpoints is disclosed. In particular, the first method can be performed by at least one first computing device configured to interface with a first server computing device cluster, and include the steps of (1) processing objects managed by the first server computing device cluster, where the objects are stored across at least two first partitions associated with the first server computing device cluster, (2) detecting a condition to facilitate a processing checkpoint with at least one second computing device configured to interface with a second server computing device cluster, where the objects are mirrored—but stored differently across at least two second partitions associated with the second server computing device cluster, (3) gathering, from each partition of the at least two first partitions, information associated with a particular number of last-processed objects, and (4) providing the information to the at least one second computing device.

In turn, the at least one second computing device can perform a second method that includes the steps of (5) receiving, from the at least one first computing device, the information associated with the particular number of last-processed objects associated with the first server computing device cluster, and (6) for each first partition of the two or more second partitions associated with the second server computing device cluster—and, in response to identifying that at least one object stored in the second partition corresponds to at least one object of the last-processed objects: updating a configuration to indicate, for the second partition, a respective offset associated with the at least one object. In this manner, the at least one second computing device is aware of where to begin processing objects within the two or more second partitions in the event that the first server computing device cluster and/or at least one first computing device fail.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
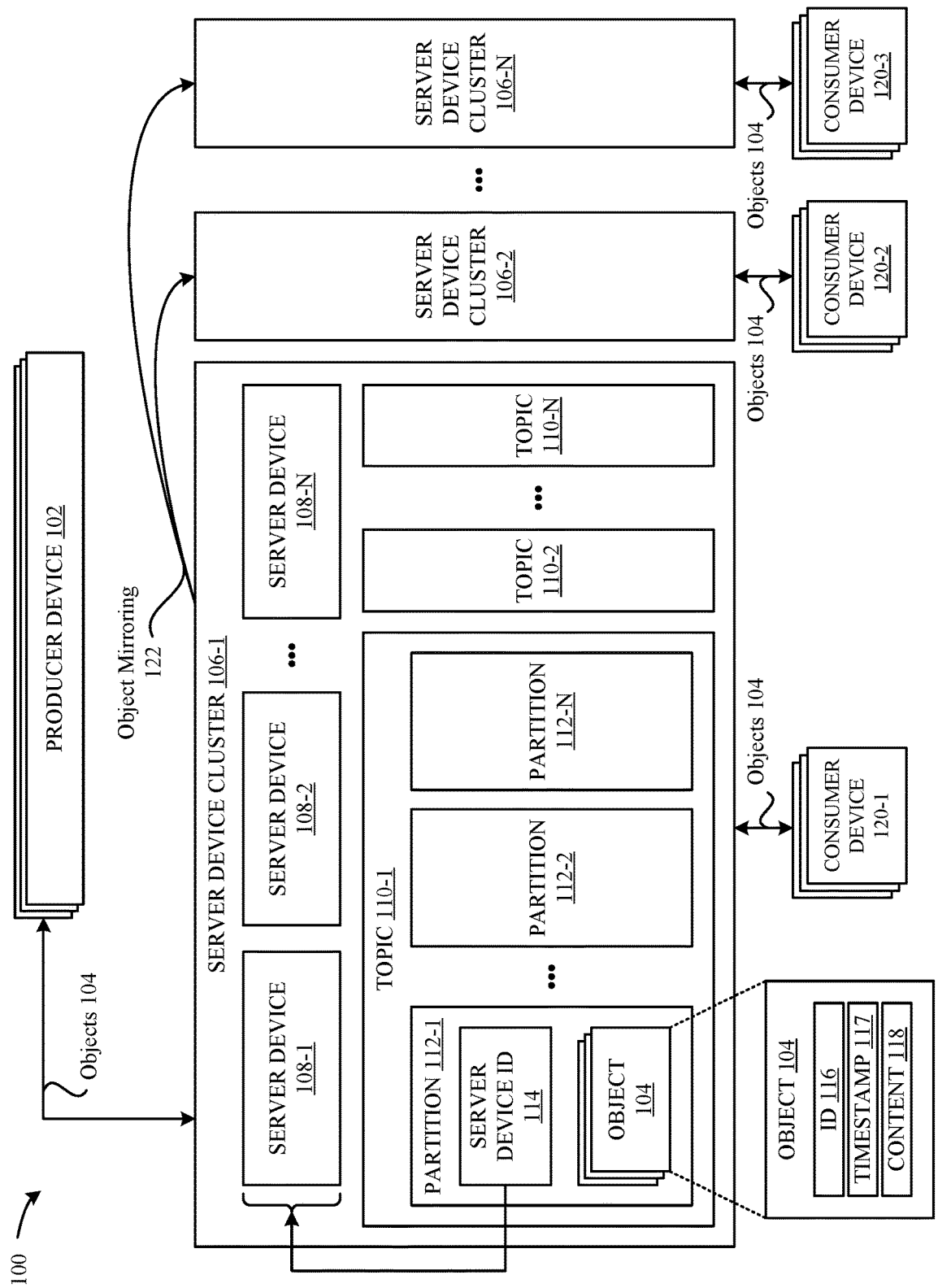
FIG. 1 illustrates a system diagram of a computing device that can be configured to perform the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well-known process steps have not been described in detail in order to avoid unnecessarily obscuring the presently described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting. On the contrary, other embodiments may be used, and changes may be made without departing from the spirit and scope of the described embodiments.

Representative embodiments disclosed herein set forth various techniques for facilitating processing checkpoints between computing devices. According to some embodiments, a primary server computing device cluster can be configured to store messages—referred to herein as "objects"—received from producer computing devices. In turn, consumer computing devices that are configured to interface with the primary server computing device cluster can obtain and process the objects. During operation, the primary server computing device cluster can be configured to interface with at least one auxiliary server computing device cluster and "mirror" (i.e., provide/copy) the objects to the auxiliary server computing device cluster. In this manner, consumer computing devices that are configured to interface with the auxiliary server computing device cluster can resume processing of the objects in the event that the primary server computing device cluster/associated consumer computing devices experience failure conditions.

As previously noted herein, it can be challenging for the consumer computing devices associated with the auxiliary server computing device cluster to effectively identify a starting point at which to begin processing the objects during a failure scenario, as common configuration discrepancies between the primary server computing device cluster and the auxiliary server computing device cluster can occur. For example, when fewer or more server computing devices are included in the auxiliary server computing device cluster, the mirrored objects are disposed differently within the auxiliary server computing device cluster. Consequently, over-aggressive approaches that involve re-processing all objects managed by the auxiliary server computing device cluster are typically employed, which is wasteful and can lead to undesirable data manipulation scenarios (e.g., duplicate transactions, redundant updates, etc.).

To cure the foregoing deficiencies, the embodiments described herein set forth techniques that involve periodically gathering, at the primary server computing device cluster, information about a particular number of last-processed objects, and providing the information—via "synchronization objects"—to the auxiliary server computing device cluster. According to some embodiments, the number of last-processed objects can be based on a variety of operational parameters associated with the various computing devices described herein, with a general goal of achieving both efficiency and accuracy. For example, while a smaller number of last-processed objects can increase the overall efficiency of the generation, transmission, and processing of the synchronization objects, it tends to correspondingly decrease the efficacy of facilitating the processing checkpoints. Conversely, while a larger number of last-processed objects can decrease the overall efficiency of the generation, transmission, and processing of the synchronization objects, it tends to correspondingly increase the efficacy of facilitating the processing checkpoints. In this regard, the various embodiments described below present different techniques that enable the number of last-processed objects to be selected in a manner that promotes both efficiency and accuracy when facilitating the processing checkpoints set forth herein.

A more detailed discussion of these techniques is set forth below and described in conjunction with FIGS. 1, 2A-2E, and 3-4, which illustrate detailed diagrams of systems and methods that can be used to implement these techniques.

FIG. 1 illustrates a block diagram of a system 100 that includes different computing devices that can be configured to implement the embodiments described herein. As shown in FIG. 1, the system 100 can include producer computing devices 102, server computing device clusters 106, and consumer computing devices 120. As a brief aside, it is noted that the internal components of the various computing devices are being omitted from the illustration of FIG. 1 in the interest of simplifying this disclosure. For example, those having ordinary skill in the art will appreciate that the computing devices illustrated in FIG. 1 can include at least one processor, at least one memory, and at least one storage device. For example, for a given computing device, the processor can be configured to load an operating system (OS) from the storage device into the memory for execution, where the OS provides a foundation on which one or more software applications can execute to provide the various functionalities of the computing device set forth in this disclosure.

According to some embodiments, the producer computing devices 102 can represent computing devices that are configured to provide data—illustrated as objects 104 in FIG. 1—to the server computing device clusters 106. For example, the producer computing devices 102 can be configured transmit objects 104 in response to particular activities being executed at the producer computing devices 102, e.g., financial transactions, login events, and so on. It is noted that the foregoing activities are merely exemplary, and that the objects 104 can be transmitted by the producer computing devices 102 in response to any condition being satisfied, without departing from the scope of this disclosure. In any case, according to some embodiments, the producer computing devices 102 can be configured to provide the objects 104 to a single server computing device cluster 106, where, in turn, the single server computing device cluster 106 "mirrors" the objects 104 (illustrated in FIG. 1 as object mirroring 122) to additional server computing device clusters 106. As a brief aside, it is noted that the term "mirroring" used throughout this disclosure represents a transmission/synchronization of data between computing devices. For example, a given server computing device cluster 106 can mirror a set of newly-received objects 104 to at least one other server computing device cluster 106 by transmitting the newly-received objects 104 to the at least one other server computing device cluster 106. Alternatively, mirroring techniques can be achieved by configuring the producer computing devices 102—or other intermediate devices not illustrated in FIG. 1—to provide the objects 104 to two or more server computing device clusters 106, where, in turn, the two or more server computing device clusters 106 can optionally mirror the objects 104 to additional server computing device clusters 106.

In any case, as shown in FIG. 1, each object 104 can include various properties, e.g., an identifier 116, a timestamp 117, and content 118. In particular, the identifier 116 can uniquely identify the object 104 within the server computing device cluster 106 in which the object 104 is stored. Moreover, the timestamp 117 can identify a time at which the object 104 was provided by a producer computing device 102 and/or received by the server computing device cluster 106. Additionally, the content 118 can function as a container for storing binary data associated with the object 104. It is noted that the above-described properties for the objects 104 are merely exemplary, and that any number of properties can be included in the objects 104 without departing from the scope of this disclosure. For example, each object 104 can include information about the producer computing device 102 that provided the object 104, network paths that were traversed when delivering the object 104, and so on. Additionally, it is noted that the content 118 of a given object 104 can store singular data items, groups of data items, etc., without departing from the scope of this disclosure.

As shown in FIG. 1, each server computing device cluster 106 can include at least one server computing device 108 that is configured to implement—either wholly, or in part—the functionality provided by the server computing device cluster 106 of which the at least one server computing device 108 is a member. According to some embodiments, the server computing device cluster 106 can be configured to manage one or more topics 110, where each topic 110 represents a particular category into which similar objects 104 can be sorted. For example, when a producer computing device 102 is providing an object 104 to the server computing device cluster 106, the object 104 can be tagged with information that identifies a particular topic 110 into which the object 104 should be sorted. Alternatively, when a producer computing device 102 provides an object 104 to the server computing device cluster 106, the server computing device cluster 106 (or other intermediary device(s)) can analyze different properties associated with the object 104—and/or, different properties associated with the producer computing device 102 that produces the object 104—to identify an appropriate topic 110 into which the object 104 should be sorted.

As shown in FIG. 1, each topic 110 can be separated into one or more partitions 112 into which the objects 104 can be sorted. In particular, each partition 112 can represent a particular server computing device 108 that provides the functionality associated with the partition 112, including the processing and storage capacity associated with the management of objects 104 that are sorted into the partition 112. For example, a particular server computing device 108 can be configured to implement at least one partition 112 for a first topic 110, at least one partition 112 for a second topic 110, and so on. This correlation is illustrated in FIG. 1 by the server computing device ID 114 that is associated with each partition 112, where the server computing device ID 114 uniquely identifies the server computing device 108 that backs the partition 112. It is noted that a given server computing device cluster 106 can be configured to support any number of topics 110, and that each topic 110 can be separated into any number of partitions 112, without departing from the scope of this disclosure.

As shown in FIG. 1, each server computing device cluster 106 can be configured to interface with at least one consumer computing device 120. For example, a consumer computing device 120 can be configured to interface with a server computing device cluster 106 to read/process the objects 104 that are managed by the server computing device cluster 106. In this manner, the server computing device clusters 106 effectively de-couple the producer computing devices 102 from the consumer computing devices 120, such that these devices can cooperate in an asynchronous manner. For example, the rates at which the producer computing devices 102 provide objects 104 and the consumer computing devices 120 process the objects 104 can differ without introducing serious logistical issues that otherwise might constrain the ability for objects 104 to be effectively processed (as with coupled/synchronous infrastructures).

As previously noted herein, challenges can occur with respect to the resumption of object 104 processing at a mirrored (i.e., auxiliary) server computing device cluster 106 that should occur when a failure occurs at a primary server computing device cluster 106. For example, although both the mirrored server computing device cluster 106 and the primary server computing device cluster 106 can store the same objects 104, the manner in which they store the objects 104 typically differs. In particular, when the mirrored server computing device cluster 106 includes fewer or more partitions 112 (i.e., server computing devices 108) for a topic 110 (in comparison to the partitions 112 for the topic 110 managed by the primary server computing device cluster 106), the objects 104 typically end up being disposed within different partitions 112 of the mirrored server computing device cluster 106 (relative to their dispositions within the partitions 112 of the primary server computing device cluster 106). As a result, it can be challenging to identify an appropriate resumption point for the consumer computing devices 120 associated with the mirrored server computing device cluster 106 (i.e., the backup consumer computing devices 120). However, as described in greater detail herein, the embodiments provide a technique that enables processing checkpoints to be established in a frequent and lightweight manner, thereby mitigating the foregoing issues with which the backup consumer computing devices 120 are faced when implementing conventional approaches.

It is noted that portions (or all) of the various functionalities set forth herein can be shifted between the various computing devices illustrated in FIG. 1 (or other computing devices not illustrated in FIG. 1) without departing from the scope of this disclosure. For example, the various embodiments set forth herein involve the consumer computing devices 120 communicating information between one another to effectively facilitate periodic processing checkpoints. However, the server computing device clusters 106 can be configured to carry out the processing checkpoints without departing from the scope of this disclosure. For example, a primary server computing device cluster 106 storing objects 104 can be configured to monitor the processing of those objects 104 by the consumer computing devices 120 associated with the primary server computing device cluster 106. In turn, and periodically—e.g., in response to a number of objects 104 being processed, in response to an amount of time lapsing, etc.—the server computing device cluster 106 can transmit processing checkpoint information to at least one auxiliary server computing device cluster 106 to enable the auxiliary server computing device cluster 106 to effectively implement the processing checkpoint. When this approach is implemented, the other server computing device cluster 106 can communicate the processing checkpoint information to a set of consumer computing devices 120 associated with the auxiliary server computing device cluster 106. In this manner, when an indication of (or a detection of) a failure of the primary server computing device cluster 106 occurs, the set of consumer computing devices 120 can interface with the auxiliary server computing device cluster 106 to resume the processing that otherwise would normally have been carried out at the primary server computing device cluster 106.

Accordingly, FIG. 1 sets forth a high-level overview of the manner in which different computing devices can be configured to implement the various techniques described herein. As described in greater detail below, these computing devices can operate in concert to facilitate efficient and flexible processing checkpoints between the server computing device clusters 106/consumer computing devices 120. Beneficially, this flexible approach can lead to improved performance without requiring excess amounts of information to be transmitted between these computing devices, the details of which will now be described below in greater detail.

Figure 2A:
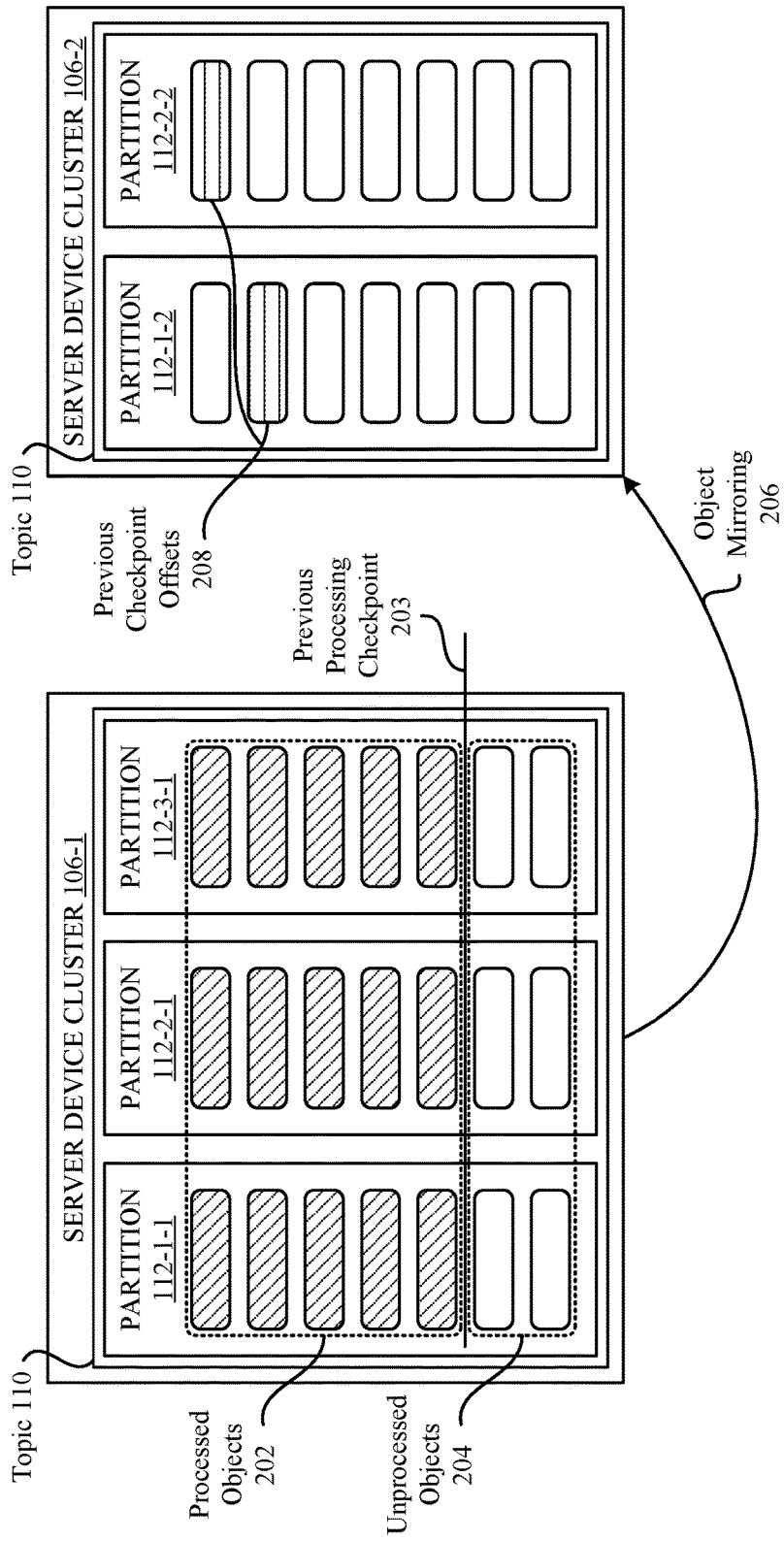
FIGS. 2A-2E illustrate conceptual diagrams of an example scenario in which a processing checkpoint associated with two server computing device clusters is communicated in a lightweight manner, according to some embodiments.

FIGS. 2A-2E illustrate conceptual diagrams of an example scenario in which a processing checkpoint associated with two server computing device clusters 106 is communicated in a lightweight manner, according to some embodiments. As shown in FIG. 2A, a first step illustrates an example state of various objects 104 that are mirrored across the two server computing device clusters 106. In particular, in the example illustrated in FIG. 2A, a first server computing device cluster 106-1 manages a topic 110 that is separated into three different partitions 112: a partition 112-1-1, a partition 112-2-1, and a partition 112-3-1. As previously mentioned herein, each partition 112 within the first server computing device cluster 106-1 can be backed by a same or a different server computing device 108. In any case, as shown in FIG. 2A, each partition 112 stores a collection of objects 104—some of which have been processed by consumer computing devices 120 associated with the first server computing device cluster 106-1 (i.e., the processed objects 202), and some of which have not been processed by consumer computing devices 120 (i.e., the unprocessed objects 204). Additionally, as shown in FIG. 2A, a previous processing checkpoint 203 illustrates a point at which a last processing checkpoint was carried out between the first server computing device cluster 106 and a second server computing device cluster 106-2.

As previously noted herein, the manner in which partitions 112 (for a given topic 110) are established within a given server computing device cluster 106 can affect the manner in which objects 104 are distributed to the partitions 112. For example, as indicated by the element 206 illustrated in FIG. 2A, object mirroring can be implemented between the first server computing device cluster 106-1 and the second server computing device cluster 106-2 to effectively cause the objects 104 received by the first server computing device cluster 106-1 to be provided to the second server computing device cluster 106-2. It is noted that the mirroring techniques can be performed using any known approach. For example, objects 104 can be individually provided by the first server computing device cluster 106-1 to the second server computing device cluster 106-2 as they are received at the first server computing device cluster 106-1. In another example, objects 104 can be provided by the first server computing device cluster 106-1 to the second server computing device cluster 106-2 in a batched manner, e.g., periodically based on an amount of time, a number of objects 104 received, and so on.

In any case, when objects 104 are received by the second server computing device cluster 106-2, the second server computing device cluster 106-2 is tasked with placing the object 104 into a particular partition 112. In this regard, the logical position of the partition 112 (relative to other partitions 112) into which the object 104 is placed within the second server computing device cluster 106-2 can differ from the logical position of the partition 112 into which the object 104 is originally placed within the first server computing device cluster 106-1. For example, a given object 104 stored in the first partition 112-1-1 of the first server computing device cluster 106-1 might end up in a first partition 112-1-2 of the second server computing device cluster 106-2—or, the object 104 might end up in a second partition 112-2-2 of the second server computing device cluster 106-2. This can depend, for example, on a current position of a round-robin scheme that is enforced by the second server computing device cluster 106-2 to ensure that the distribution of the objects to the first partition 112-1-2 and the second partition 112-2-2 is conducted in a balanced manner. Additionally, and as illustrated in FIG. 2A, the second server computing device cluster 106-2 can be associated with previous checkpoint offsets 208 that effectively indicate, to the consumer computing devices 120 associated with the second server computing device cluster 106-2, points within the first partition 112-1-2 and the second partition 112-2-2 at which processing should resume in the event of a failure of the first server computing device cluster 106-1 (and/or the consumer computing devices 120 associated therewith).

Accordingly, FIG. 2A sets forth an example initial state of objects 104 that are mirrored across the first server computing device cluster 106-1 and the second server computing device cluster 106-2. At this juncture, additional steps illustrated in FIGS. 2B-2E detail the manner in which (1) additional objects 104 can be processed, and (2) additional processing checkpoints can be facilitated between the first server computing device cluster 106-1 and the second server computing device cluster 106-2.

Figure 2B:
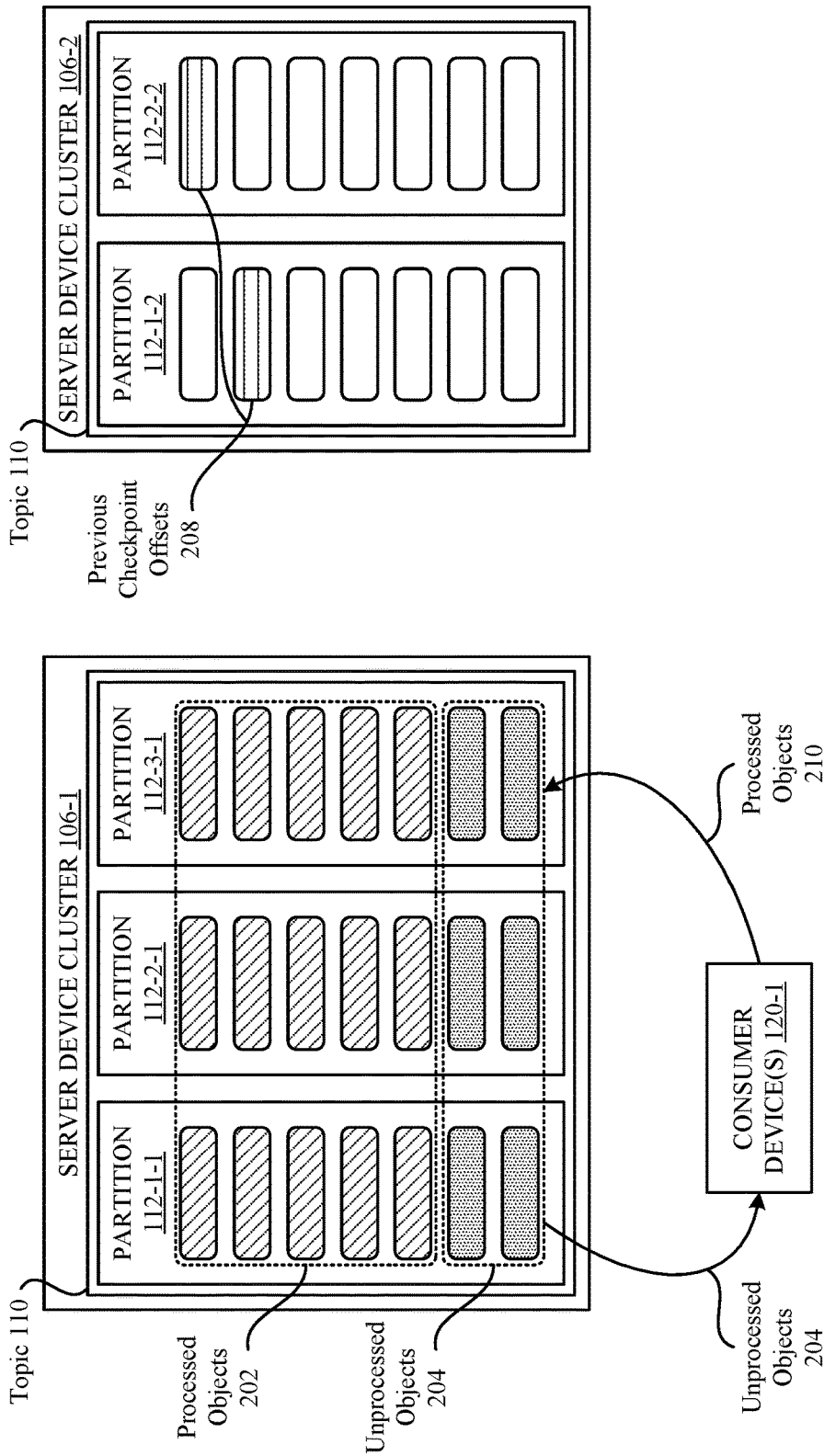

Turning now to FIG. 2B, a second step of the example scenario involves consumer computing devices 120-1 (associated with the first server computing device cluster 106-1) processing at least a subset of the unprocessed objects 204 managed by the first server device cluster 106-1. This can involve, for example, the consumer computing devices 120-1 reading the unprocessed objects 104 in succession from the different partitions 112 included in the first server computing device cluster 106-1, and carrying out some form of logic against each unprocessed object 104. For example, the consumer computing devices 120-1 can identify when a particular producer computing device 102 that issues one or more objects 104 is suspected of fraudulent activity. In another example, the consumer computing devices 120-1 can identify when a group of producer computing devices 102 that issue objects 104 exhibit similar behavior that should be flagged. In any case, as the consumer computing devices 120-1 process the unprocessed objects 104, the unprocessed objects 104 are converted into processed objects 210, which is reflected within the illustration provided in FIG. 2B. It is noted that a processing checkpoint is not yet carried out in the second step illustrated in FIG. 2B, as one or more processing checkpoint conditions have not yet been met in the context of the example scenario. For example, the first server computing device cluster 106-1/consumer computing devices 120-1 can be configured to trigger a processing checkpoint when a threshold number of objects 104 are processed by the consumer computing devices 120-1, when a threshold period of time lapses, and so on. Again, it is noted that the foregoing conditions are merely exemplary, and that the first server computing device cluster 106-1/consumer computing devices 120-1 can be configured to carry out a processing checkpoint in response to any number/kind of conditions being satisfied without departing from the scope of this disclosure.

Figure 2C:
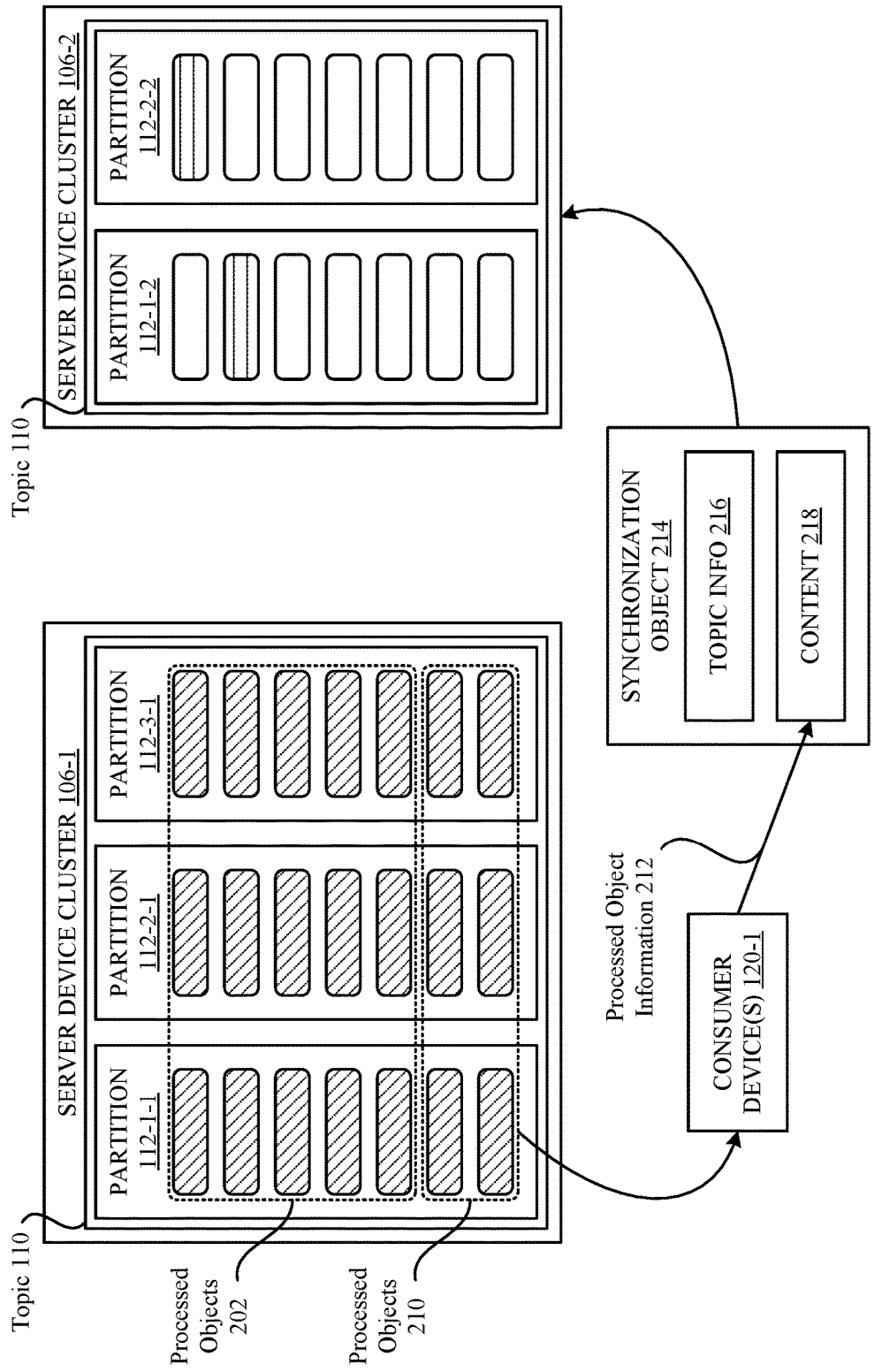

Accordingly, and turning now to FIG. 2C, a third step involves the consumer computing devices 120-1 associated with the first server computing device cluster 106-1 (1) detecting a checkpoint condition, and (2) transmitting, to the second server computing device cluster 106-2, a synchronization object 214 that includes information about (i) a topic 110, and (ii) a number of last-processed objects 104 associated with the topic 110. It is noted that the number of last-processed objects 104 from which information is gathered can be adjusted in accordance with a variety of factors to ensure that the processing checkpoint is lightweight, yet effective. For example, the number of last-processed objects 104 can be based on the number of partitions 112 in which the last-processed objects 104 are disposed. The number of last-processed objects 104 can also be based on the rate at which objects 104 are received by the first server computing device cluster 106-1 and/or processed by the consumer computing devices 120-1. It is noted that the foregoing considerations are exemplary, and that the number of last-processed objects 104 from which information is gathered can be based on any operational characteristics of the system 100 illustrated in FIG. 1. Additionally, it is noted that the information included in the synchronization object 214 for a given last-processed object 104 can include any property associated with the last-processed object 104, e.g., the ID 116, the timestamp 117, the content 118. Additionally, it is noted that the information can include additional content that is derived from any of the foregoing properties of the last-processed object 104, including hash values produced by executing hash functions against all or a portion of the properties. It is further noted that the information can include additional content that is not specifically associated with the object 104, e.g., information about the consumer computing device 120-1 that processed the object 104, information about the partition 112 in which the last-processed object 104 was originally included, and so on.

According to some embodiments, the size of the synchronization object 214 can be determined by multiplying the following values together: (i) the selected number of last-processed objects 104, (ii) the number of partitions 112, and (iii) the size of the ID 116 (of the objects 104). For example, when (i) twelve (12) last-processed objects 104 are selected, (ii) the number of partitions is one-hundred (100), and (iii) the size of each ID 116 (for each object 104) is eight bytes (e.g., a 64-bit value), the size of the synchronization object 214 ends up being 9.6 kilobytes. In this regard, the synchronization object 214 can be lightweight and efficient to transfer/process between the consumer devices 120, thereby facilitating a practical approach for carrying out the techniques set forth herein. In particular, even when the synchronization object 214 takes on a relatively small size (e.g., as set forth above), the synchronization object 214 can be effective in enabling the recipient consumer devices 120 to establish checkpoints in an accurate manner. To illustrate this notion, an overall probability that the recipient consumer devices 120 can effectively checkpoints across their respective partitions 112 can be pre-identified based on the values that are utilized (e.g., the number of last-processed objects 104, the number of partitions 112, the size of the IDs 116 of the objects 104, etc.). In particular, the overall probability can be calculated using the following equation: $P(X=0)=S(n^*p, p)^*p!/p^{\wedge}(n^*p)$, where (i) $P(X=0)$ represents the resultant probability, (ii) "n" represents the number of last-processed objects 104, (iii) "p" represents the largest number of partitions 112 for any topic 110, and (iv) $S(n^*p, p)$ represents Stirling's approximation. In this regard, it is noted that even when a selection of a smaller number of last-processed objects 104 is enforced (e.g., twenty (20))—and the number of partitions 112 is reasonable (e.g., one-hundred (100)), the probability that each consumer device 120 is able to effectively identify a checkpoint within its respective partition 112 is 99.9%. It is noted that the foregoing parameters are merely exemplary, and that any number of last-processed objects 104, partitions 112, and ID 116 (or other information) sizes can be selected without departing from the scope of this disclosure.

Returning now to the example illustrated in FIG. 2C, it is noted that the number of last-processed objects 104 is set to two (2) last-processed objects 104 for each partition 112 within the first server computing device cluster 106-1 for the purpose of simplifying this disclosure. In this regard, the consumer computing devices 120-1 gather information from a total of six (6) last-processed objects 104 (i.e., two last-processed objects 104 for each of the three partitions 112-1-1, 112-2-1, and 112-3-1). Again, its noted that the number of last-processed objects 104 is merely exemplary, and that any number of last-processed objects 104 can be analyzed without departing from the scope of this disclosure. Moreover, it is noted that varying numbers of last-processed objects 104 can be analyzed across the different partitions 112 managed by the first server device cluster 106-1 without departing from the scope of this invention. In any case, this information—illustrated in FIG. 2C as processed object information 212—is included in content 218 of the synchronization object 214. Additionally, and as shown in FIG. 2C, the synchronization object 214 can include topic information 216 that identifies the topic 110 to which the processed object information 212 corresponds (i.e., the topic 110 managed by the first server computing device cluster 106-1). In turn, the synchronization object 214 can be transmitted to the second server computing device cluster 106-2 (and/or the consumer computing devices 120 associated therewith), which, in turn, can utilize the synchronization object 214 to effectively implement the processing checkpoint.

Figure 2D:
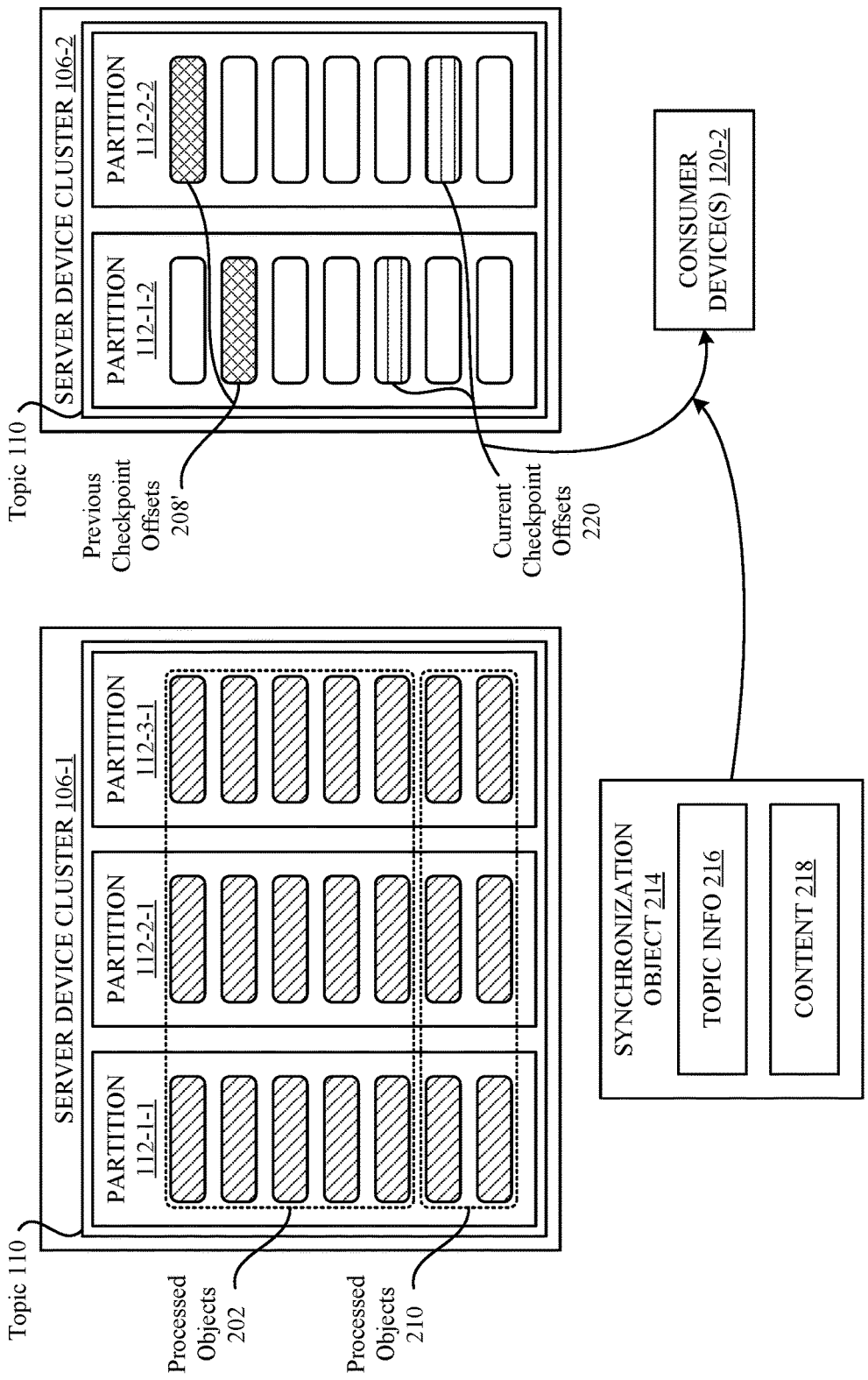
Figure 2E:
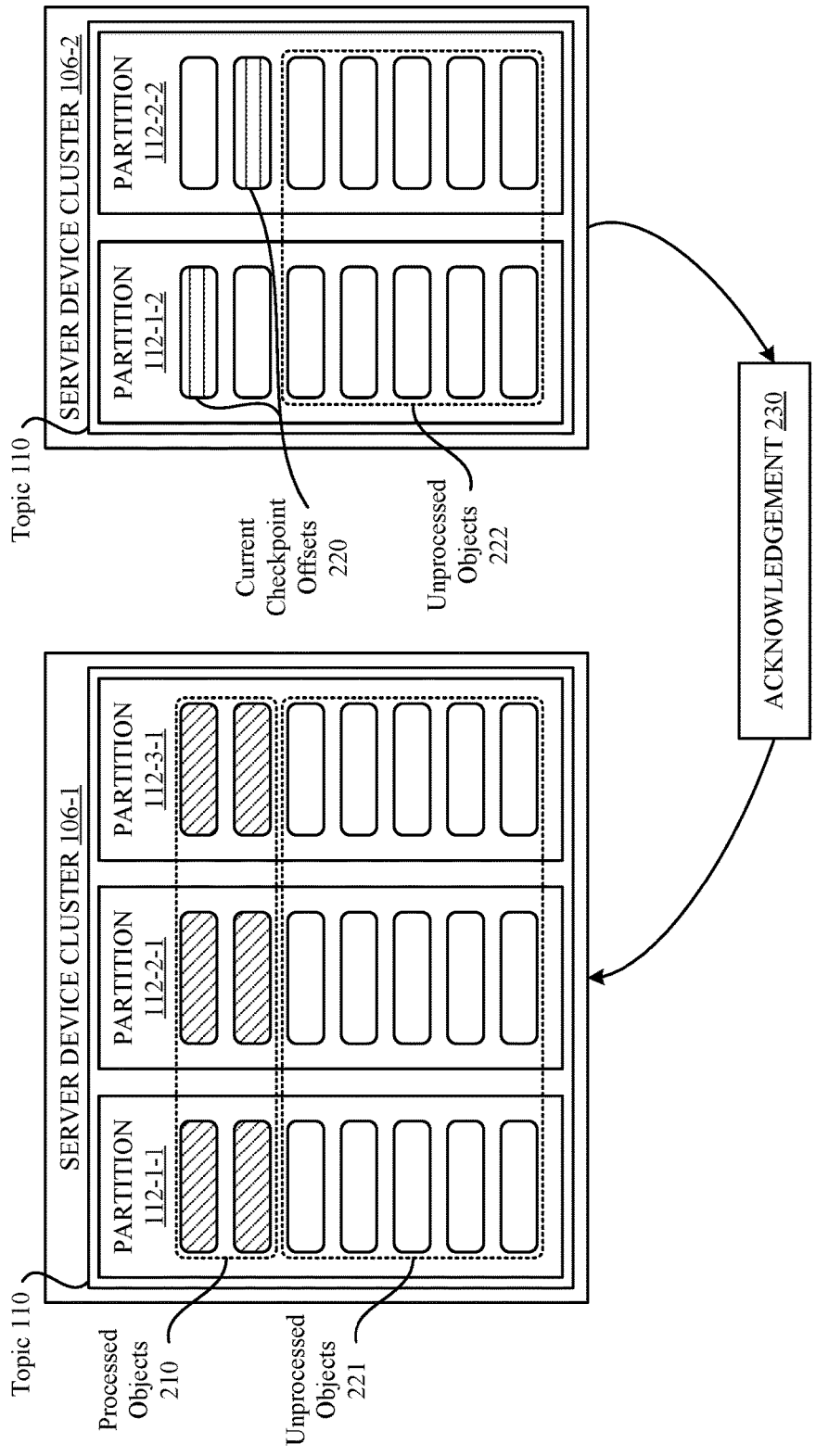

Turning now to FIG. 2D, a fourth step involves the consumer computing devices 120 associated with the second server computing device cluster 106-2—illustrated in FIG. 2D as consumer computing devices 120-2—processing the synchronization object 214 to facilitate the processing checkpoint. However, as previously set forth herein, it is noted that the second server computing device cluster 106-2 can implement all or a portion of the techniques carried out by the consumer computing devices 120-2 without departing from the scope of this disclosure. In any case, as shown in FIG. 2D, the consumer computing devices 120-2 can utilize the information included in the synchronization object 214 to facilitate the processing checkpoint. In particular, and as shown in FIG. 2D, facilitating the processing checkpoint can involve the consumer devices 120-2 identifying current checkpoint offsets 220 within the partitions 112 managed by the second server computing device cluster 106-2. To facilitate this identification, the consumer computing devices 120-2 can be configured to (1) parse the information associated with the last-processed objects 104 included in the content 218 of the synchronization object 214, and (2) compare the information to the objects 104 included in the partitions 112 managed by the second server computing device cluster 106-2. Various techniques can be utilized to facilitate the above-described comparisons, which will now be described below in greater detail.

According to some embodiments, for a given last-processed object 104, the consumer computing devices 120-2 can attempt to identify a corresponding object 104 based on matching properties, or on matching derivatives of the properties (e.g., hash values), of the objects 104. It is noted that additional measures can be employed to enhance the overall efficiency when attempting to identify matches between the objects 104. For example, when the IDs 116 of the objects 104 are incremental in nature, the consumer computing devices 120-2 can approximate their locations within the partitions 112 based on the ID 116 of a current object 104 that is being analyzed by the consumer computing devices 120-2. In particular, when the ID 116 for a current object 104 being analyzed is greater than the ID 116 of the last-processed object 104 being sought, the consumer computing devices 120-2 can know to skip back by a certain number (e.g., based on a different between the IDs 116), and vice-versa. In another example, the consumer computing devices 120-2 can identify, for each partition 112 of the two partitions 112 managed by the second server computing device cluster 106-2, unique properties for the partition 112 that can further-enhance overall seek efficiencies. For example, the consumer computing devices 120-2 can identify that the first partition 112 stores only even-numbered IDs 116, and that the second partition 112 stores only odd-numbered IDSs 116 (e.g., when a round-robin distribution scheme is utilized between the two partitions 112). In this regard, when the consumer computing devices 120-2 attempt to match an even-numbered ID 116 for a given last-processed object 104, the consumer computing devices 120-2 can disregard the second partition 112 (which only stores objects 104 having odd-numbered IDs 116)—and vice versa—which effectively halves the amount of work that otherwise might be required to perform the match. It is noted that the foregoing techniques are merely exemplary, and that any form of matching can be employed without departing from the scope of this disclosure. For example, the consumer computing devices 120-2 can be configured to utilize the timestamps 117, the content 118—as well as any additional aspects—when attempting to locate matching objects 104. Additionally, it is noted that is not a requirement for the last-processed objects 104 included in the synchronization object 214 to be analyzed in succession. On the contrary, the consumer devices 120-2 can analyze the information included in the synchronization object 214 in any order without departing from the scope of this disclosure.

It is additionally noted that, in some cases, a comprehensive match of all the last-processed objects 104 included in the synchronization object 214 might not occur under certain conditions. For example, one or more objects 104 managed by the second server computing device cluster 106-2 can be missing, e.g., as a result of mirroring errors, data retention policies, and so on. In this regard, it is noted that increasing the number of last-processed objects 104 that are gathered from the partitions 112 managed by the first server computing device cluster 106-1 can increase the overall probability that a matching object 104 can be identified within each of the partitions 112 managed by the second server computing device cluster 106-2. However, such increases can result in larger synchronization objects 214, which correspondingly increase the amount of resources required to prepare, transmit, and process the synchronization objects 214. Therefore, as previously described herein, the number of last-processed objects 104 that are gathered in association with a processing checkpoint can be fine-tuned to maximize the probability that a matching object 104 will be identified within each of the partitions 112, while at the same time avoiding unnecessarily bloating the synchronization objects 214 with extraneous information.

Accordingly, at the conclusion of the fourth step in FIG. 2D, the previous checkpoint offsets 208 transition into previous checkpoint offsets 208', with the current checkpoint offsets 220 taking priority. In turn, the example scenario proceeds to a fifth step illustrated in FIG. 2E, which involves (1) the second server device cluster 106-2 transmitting an acknowledgement 230 to the first server device cluster 106-1, and (2) the first server computing device cluster 106-1 continuing the mirroring, processing, and synchronization of new/unprocessed objects 104 with the second server computing device cluster 106-2. According to some embodiments, the acknowledgement 230 can indicate whether the processing checkpoint was successfully facilitated by the second server device cluster 106-2. Additionally, the processing checkpoint can include information about various results of the processing checkpoint, e.g., a number of objects 104 that were successfully matched/unmatched, to enable the first server device cluster 106-1 to fine-tune the manner in which the number of last-processed objects 104 are analyzed when preparing synchronization objects 214. For example, when the acknowledgment 230 indicates that no objects 104 could successfully be matched within a particular partition 112 of the second server device cluster 106-2, the first server device cluster 106-1 can issue an updated synchronization object 214 that includes information for an increased number of last-processed objects 104 (relative to a previous number that resulted in the failure).

Aside from the facilitation of the processing checkpoint, the first server computing device cluster 106-1 can continue to receive unprocessed objects 221, and, in turn, mirror the unprocessed objects 221 to the second server computing device cluster 106-2 (as unprocessed objects 222). Subsequently, when appropriate conditions are met—e.g., when the consumer computing devices 120-1 process threshold numbers of the unprocessed objects 221, when periods of time lapse, etc.—additional processing checkpoints can be carried out in accordance with the techniques described above in conjunction with FIGS. 2B-2D.

Accordingly, FIGS. 2A-2E illustrate conceptual diagrams of the manner in which the various computing devices of FIG. 1 can operate in concert to facilitate efficient and flexible processing checkpoints between the server computing device clusters 106/consumer computing devices 120. An additional breakdown of the manner in which these entities communicate with one another and carry out the techniques set forth herein is provided below in conjunction with FIGS. 3A-3B.

Figure 3A:
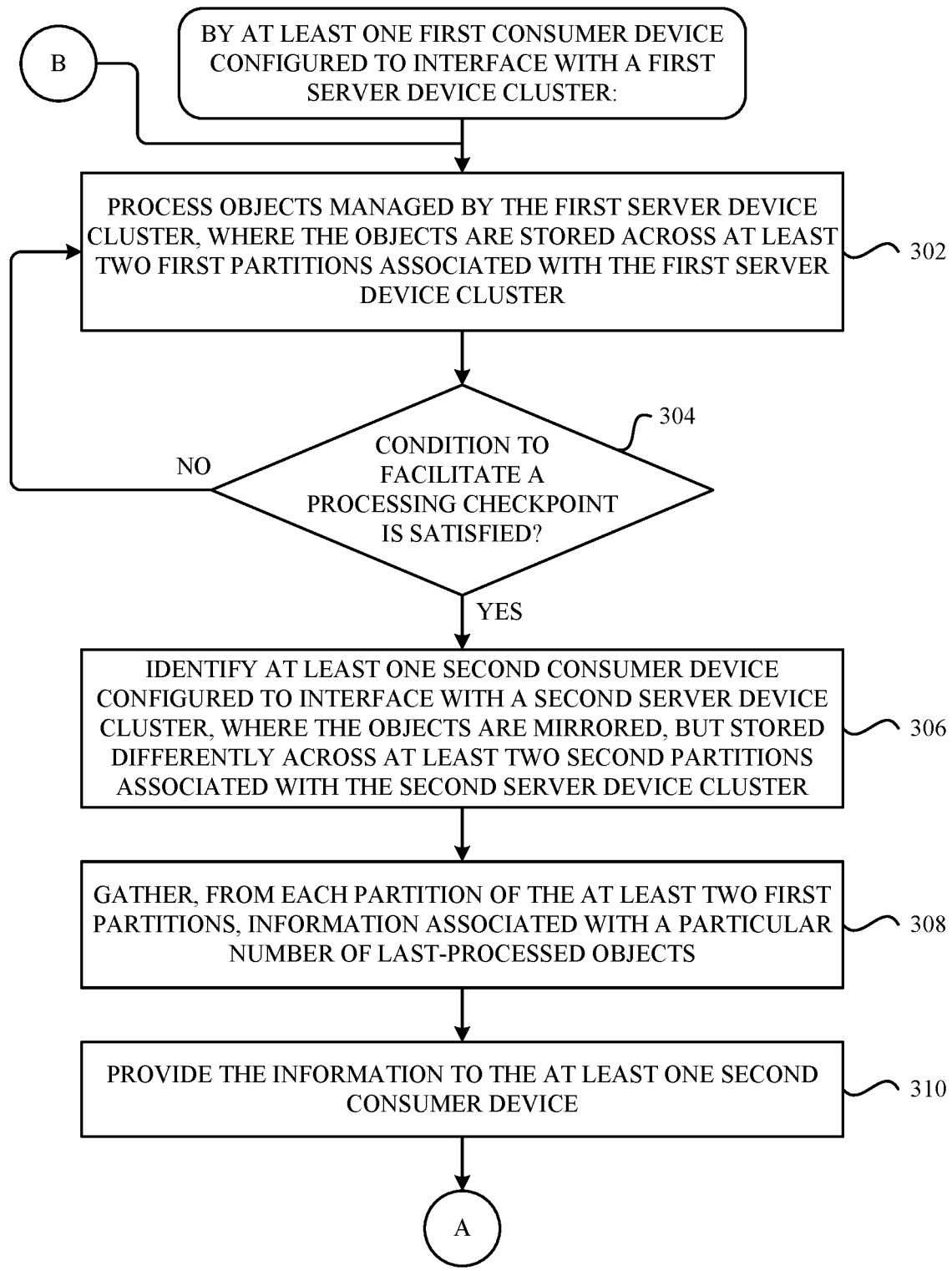
FIGS. 3A-3B illustrate a method for facilitating processing checkpoints, according to some embodiments.
Figure 3B:
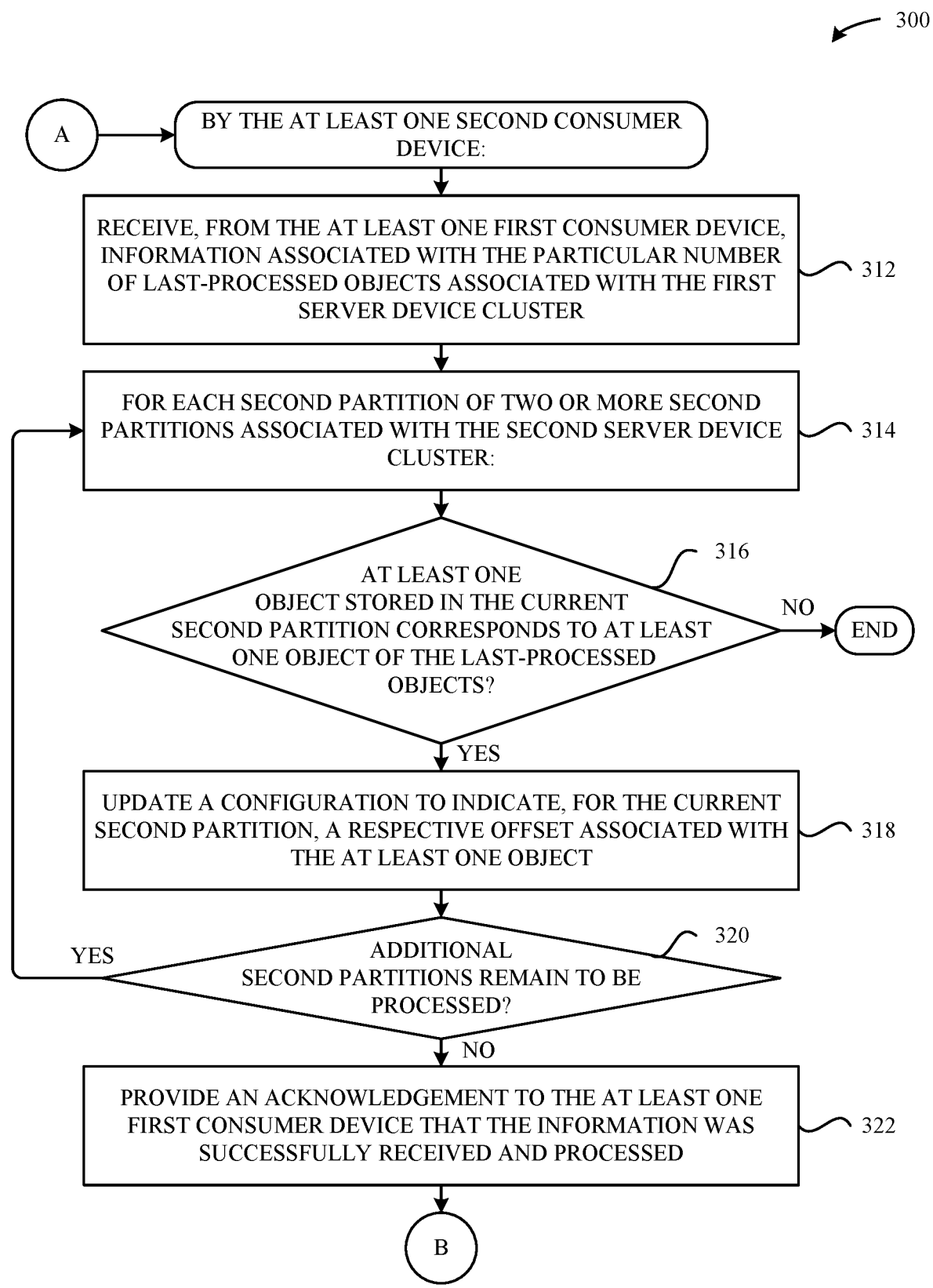

In particular, FIGS. 3A-3B illustrate a method 300 for facilitating processing checkpoints between consumer devices 120, according to some embodiments. As shown in FIG. 3A, the method 300 begins at step 302, which involves at least one first consumer computing device 120 processing objects 104 managed by a first server computing device cluster 106, where the objects 104 are stored across at least two first partitions 112 associated with the first server computing device cluster 106. At step 304, the at least one first consumer computing device 120 determines whether a condition to facilitate a processing checkpoint is satisfied (e.g., as previously described above in conjunction with FIGS. 2B-2C). If, at step 304, the at least one first consumer computing device 120 determines that the condition to facilitate the processing checkpoint not satisfied, then the method 300 proceeds back to step 302, where the at least one first consumer computing device 120 continues to process objects 104 managed by the first server computing device cluster 106 until the condition at step 304 is satisfied. Ultimately, when the condition at step 304 is satisfied, the method 300 proceeds to step 306, which involves the at least one first consumer computing device 120 identifying at least one second consumer computing device 120 configured to interface with a second server computing device cluster 106. In particular, the objects 104 are mirrored with the second server device cluster 106, but stored differently across at least two second partitions 112 associated with the second server computing device cluster 106.

At step 308, the at least one first consumer computing device 120 gathers, from each partition 112 of the at least two first partitions 112, information associated with a particular number of last-processed objects 104 (e.g., as previously described above in conjunction with FIG. 2C). At step 310, the at least one first consumer computing device 120 provides the information to the at least one second consumer computing device 120 (e.g., as also previously described above in conjunction with FIG. 2C).

Turning now to FIG. 3B, at step 312, the at least one first consumer computing device 120 receives, from the at least one first computing device, information associated with the particular number of last-processed objects 104 associated with the first server computing device cluster 106 (e.g., as previously described above in conjunction with FIG. 2D).

At step 314, the at least one first consumer computing device 120 performs steps 316-318 for each second partition 112 of two or more second partitions 112 associated with the second server computing device cluster 106. In particular, at step 316, the at least one first consumer computing device 120 determines—for a current second partition 112 of the two or more second partitions 112 (associated with the second server computing device cluster 106)—whether at least one object 104 stored in the second partition 112 corresponds to at least one object 104 of the last-processed objects 104 (e.g., as previously described above in conjunction with FIG. 2D). If, at step 316, the at least one first consumer computing device 120 determines that at least one object 104 stored in the second partition 112 corresponds to at least one object 104 of the last-processed objects 104, then the method 300 proceeds to step 318, which is described below in greater detail. Otherwise, the method 300 ends, as a valid processing checkpoint cannot be established.

At step 318, the at least one first consumer computing device 120 updates a configuration to indicate, for the second partition 112, a respective offset associated with the at least one object (e.g., as previously described above in conjunction with FIG. 2D). At step 320 the at least one first consumer computing device 120 determines whether additional second partitions 112 of the two or more second partitions 112 (associate with the second server computing device cluster 106) remain to be processed. If, at step 320, the at least one first consumer computing device 120 determines that additional second partitions 112 of the two or more second partitions 112 remain to be processed, then the method 300 proceeds back to step 316, where the at least one first consumer computing device 120 processes a next second partition 112 of the two or more partitions 112 as the current second partition 112. Otherwise, if, at step 320 the at least one first consumer computing device 120 determines that all second partitions 112 of the two or more second partitions 112 have been processed, then the method 300 proceeds to step 322.

At step 322, the at least one first consumer computing device 120 provides, to the at least one second consumer computing device 120, an acknowledgement that the information was successful received (at step 312) and processed (at steps 314-320) (e.g., as previously described above in conjunction with FIG. 2E). In turn, the method 300 can proceed back to step 302, where the at least one first consumer computing device 120 can continue processing new incoming objects 104—and, subsequently, carry out additional processing checkpoints with the at least one second consumer computing device 120 as appropriate.

Figure 4:
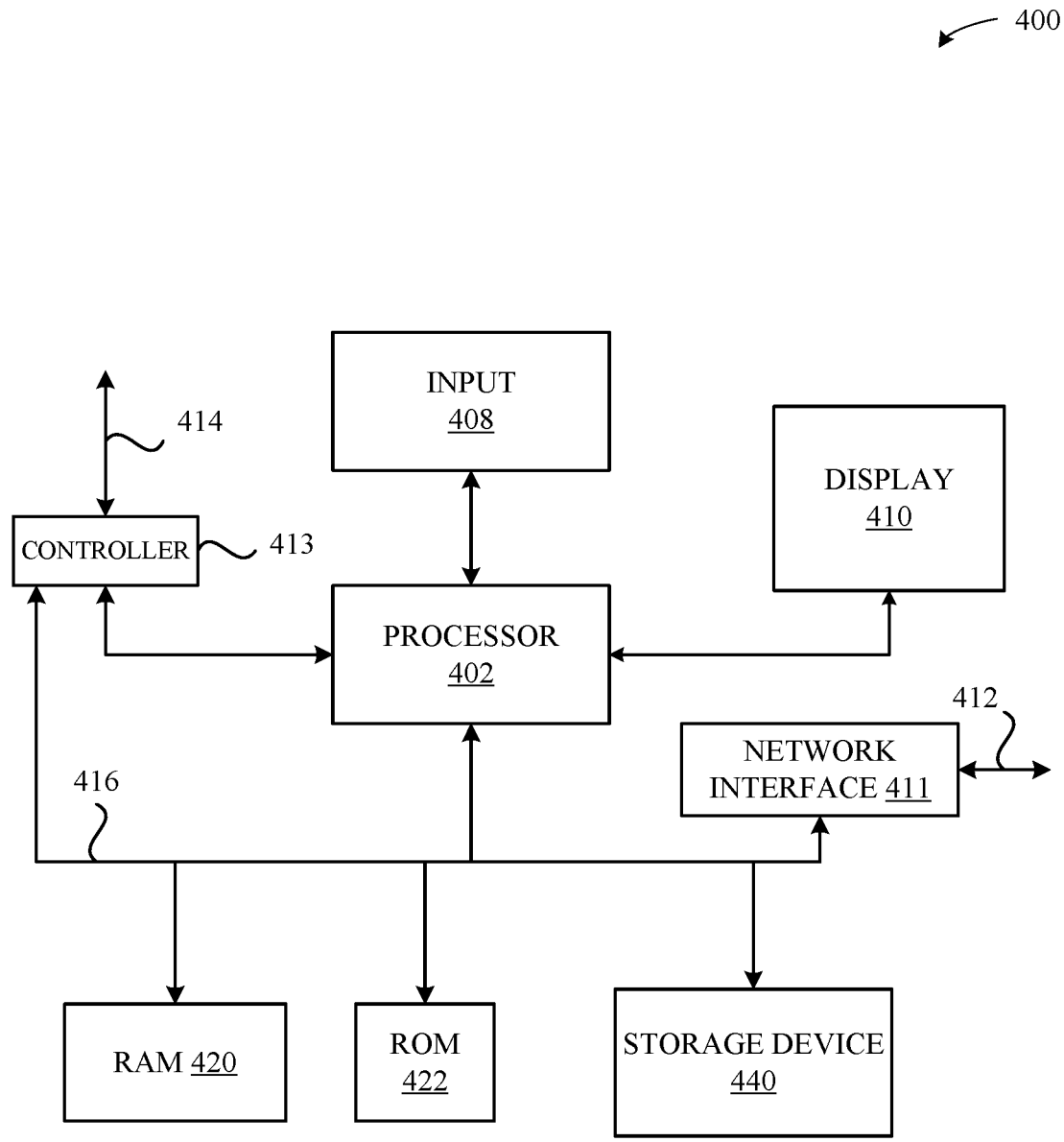
FIG. 4 illustrates a detailed view of a computing device that can be used to implement the various techniques described herein, according to some embodiments.

FIG. 4 illustrates a detailed view of a computing device 400 that can be used to implement the various techniques described herein, according to some embodiments. In particular, the detailed view illustrates various components that can be included in the computing device 102 described in conjunction with FIG. 1. As shown in FIG. 4, the computing device 400 can include a processor 402 that represents a microprocessor or controller for controlling the overall operation of the computing device 400. The computing device 400 can also include a user input device 408 that allows a user of the computing device 400 to interact with the computing device 400. For example, the user input device 408 can take a variety of forms, such as a button, keypad, dial, touch screen, audio input interface, visual/image capture input interface, input in the form of sensor data, and so on. Still further, the computing device 400 can include a display 410 that can be controlled by the processor 402 (e.g., via a graphics component) to display information to the user. A data bus 416 can facilitate data transfer between at least a storage device 440, the processor 402, and a controller 413. The controller 413 can be used to interface with and control different equipment through an equipment control bus 414. The computing device 400 can also include a network/bus interface 411 that couples to a data link 412.

In the case of a wireless connection, the network/bus interface 411 can include a wireless transceiver.

As noted above, the computing device 400 also includes the storage device 440, which can comprise a single disk or a collection of disks (e.g., hard drives). In some embodiments, storage device 440 can include flash memory, semiconductor (solid-state) memory or the like. The computing device 400 can also include a Random-Access Memory (RAM) 420 and a Read-Only Memory (ROM) 422. The ROM 422 can store programs, utilities or processes to be executed in a non-volatile manner. The RAM 420 can provide volatile data storage, and stores instructions related to the operation of applications executing on the computing device 400.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid-state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enabling a first server computing device that interfaces with a first server computing device cluster to facilitate processing checkpoints with at least one second computing device that interfaces with a second server computing device cluster, the method comprising, at the first server computing device:
   receiving, from the at least one second computing device, information associated with a particular number of last-processed objects associated with the second server computing device cluster; and
   for each first partition of two or more first partitions associated with the first server computing device cluster:
      in response to identifying that at least one object stored in the first partition corresponds to at least one object of the last-processed objects:
         updating a respective configuration of the first partition to indicate, for the first partition, a respective offset that is based on the at least one object.

2. The method of claim 1, further comprising, for each first partition of the two or more first partitions associated with the first server computing device cluster:
   in response to identifying that at least one object stored in the first partition does not correspond to at least one object of the last-processed objects:
      leaving the respective configuration of the first partition intact, wherein the respective configuration indicates a respective offset for the first partition that corresponds to a last-processed object within the first partition.

3. The method of claim 1, wherein identifying that at least one object stored in a first partition of the two or more first partitions corresponds to at least one object of the last-processed objects comprises:
   comparing a unique identifier associated with the at least one object against respective unique identifiers associated with the last-processed objects.

4. The method of claim 3, wherein the respective unique identifiers are hash values produced by issuing a hash function against respective unique properties associated with the objects.

5. The method of claim 1, further comprising:
   in response to identifying that each of the last-processed objects corresponds to an object stored in any first partition of the two or more first partitions:
      issuing, to the at least one second computing device, an acknowledgement that the information is successfully received and processed.

6. The method of claim 1, wherein each object stored in any first partition of the two or more first partitions includes:
   a unique identifier; and
   a byte array for storing data.

7. The method of claim 1, wherein at least one object of the objects is stored:
   within a first particular partition of the two or more first partitions associated with the first server computing device cluster, and
   within a second particular partition of two or more second partitions associated with the second server computing device cluster, and a manner in which the first particular partition is logically disposed within the two or more first partitions is distinct from a manner in which the second particular partition is logically disposed within the two or more second partitions.

8. A first server computing device configured that interfaces with a first server computing device cluster and is configured to facilitate processing checkpoints with at least one second computing device that interfaces with a second server computing device cluster, the first server computing device comprising a processor configured to cause the first server computing device to carry out steps that include:
   receiving, from the at least one second computing device, information associated with a particular number of last-processed objects associated with the second server computing device cluster; and
   for each first partition of two or more first partitions associated with the first server computing device cluster:
      in response to identifying that at least one object stored in the first partition corresponds to at least one object of the last-processed objects:
         updating a respective configuration of the first partition to indicate, for the first partition, a respective offset that is based on the at least one object.

9. The first server computing device of claim 8, wherein the steps further include, for each first partition of the two or more first partitions associated with the first server computing device cluster:

in response to identifying that at least one object stored in the first partition does not correspond to at least one object of the last-processed objects:
  leaving the respective configuration of the first partition intact, wherein the respective configuration indicates a respective offset for the first partition that corresponds to a last-processed object within the first partition.

10. The first server computing device of claim 8, wherein identifying that at least one object stored in a first partition of the two or more first partitions corresponds to at least one object of the last-processed objects comprises:
  comparing a unique identifier associated with the at least one object against respective unique identifiers associated with the last-processed objects.

11. The first server computing device of claim 10, wherein the respective unique identifiers are hash values produced by issuing a hash function against respective unique properties associated with the objects.

12. The first server computing device of claim 8, wherein the steps further include:
  in response to identifying that each of the last-processed objects corresponds to an object stored in any first partition of the two or more first partitions:
    issuing, to the at least one second computing device, an acknowledgement that the information is successfully received and processed.

13. The first server computing device of claim 8, wherein each object stored in any first partition of the two or more first partitions includes:
  a unique identifier; and
  a byte array for storing data.

14. A non-transitory computer readable storage medium configured to store instructions that, when executed by a processor included in a first server computing device that interfaces with a first server computing device cluster, enable the first server computing device to facilitate processing checkpoints with at least one second computing device that interfaces with a second server computing device cluster, by carrying out steps that include:
  receiving, from the at least one second computing device, information associated with a particular number of last-processed objects associated with the second server computing device cluster; and
  for each first partition of two or more first partitions associated with the first server computing device cluster:
    in response to identifying that at least one object stored in the first partition corresponds to at least one object of the last-processed objects:
      updating a respective configuration of the first partition to indicate, for the first partition, a respective offset that is based on the at least one object.

15. The non-transitory computer readable storage medium of claim 14, wherein the steps further include, for each first partition of the two or more first partitions associated with the first server computing device cluster:
  in response to identifying that at least one object stored in the first partition does not correspond to at least one object of the last-processed objects:
    leaving the respective configuration of the first partition intact, wherein the respective configuration indicates a respective offset for the first partition that corresponds to a last-processed object within the first partition.

16. The non-transitory computer readable storage medium of claim 14, wherein identifying that at least one object stored in a first partition of the two or more first partitions corresponds to at least one object of the last-processed objects comprises:
  comparing a unique identifier associated with the at least one object against respective unique identifiers associated with the last-processed objects.

17. The non-transitory computer readable storage medium of claim 16, wherein the respective unique identifiers are hash values produced by issuing a hash function against respective unique properties associated with the objects.

18. The non-transitory computer readable storage medium of claim 14, wherein the steps further include:
  in response to identifying that each of the last-processed objects corresponds to an object stored in any first partition of the two or more first partitions:
    issuing, to the at least one second computing device, an acknowledgement that the information is successfully received and processed.

19. The non-transitory computer readable storage medium of claim 14, wherein each object stored in any first partition of the two or more first partitions includes:
  a unique identifier; and
  a byte array for storing data.

20. The non-transitory computer readable storage medium of claim 14, wherein at least one object of the objects is stored:
  within a first particular partition of the two or more first partitions associated with the first server computing device cluster, and
  within a second particular partition of two or more second partitions associated with the second server computing device cluster, and a manner in which the first particular partition is logically disposed within the two or more first partitions is distinct from a manner in which the second particular partition is logically disposed within the two or more second partitions.

* * * * *